C. P. TOLMAN.
STRIP SOLDER.
APPLICATION FILED JAN. 19, 1915.
1,162,823.
Patented Dec. 7, 1915.
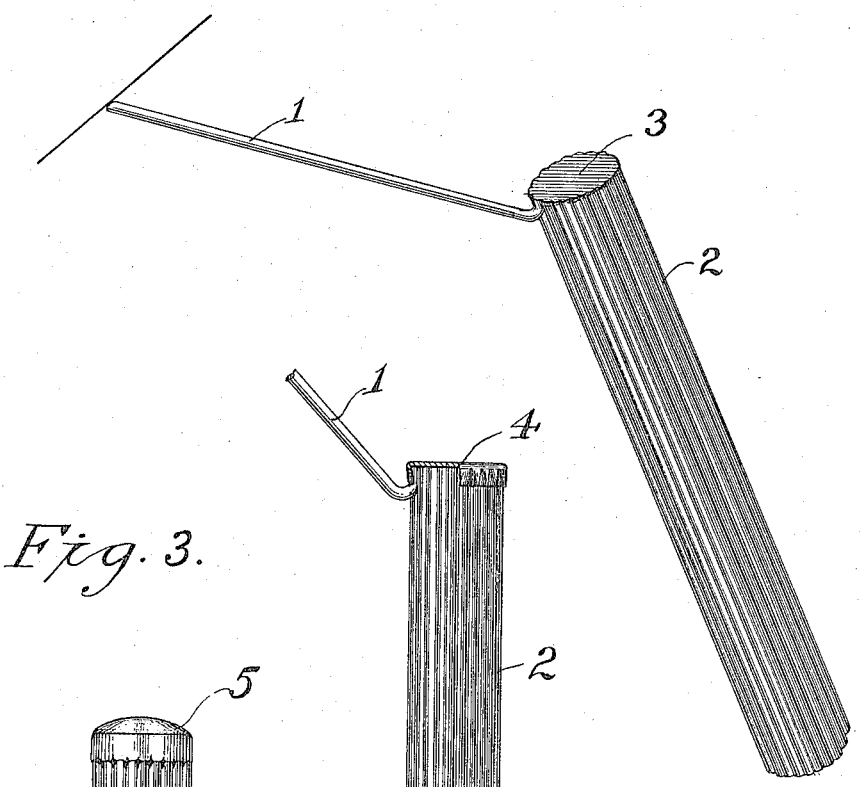
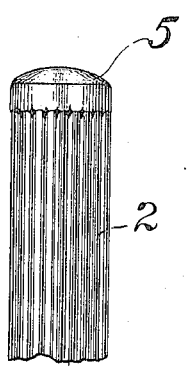
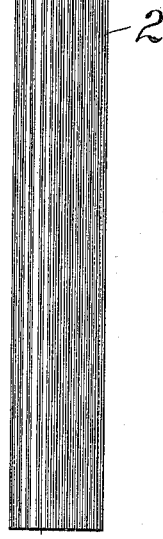
Witnesses:
Charles P. Tolman, Inventor
By Attorneys

UNITED STATES PATENT OFFICE.

CHARLES P. TOLMAN, OF NEW YORK, N. Y., ASSIGNOR TO NATIONAL LEAD COMPANY, OF NEW YORK, N. Y., A CORPORATION OF NEW JERSEY.

STRIP-SOLDER.

1,162,823. Specification of Letters Patent. Patented Dec. 7, 1915.

Application filed January 19, 1915. Serial No. 3,134.

*To all whom it may concern:*

This specification is to witness that I, CHARLES P. TOLMAN, a citizen of the United States, residing in the city, county, and State of New York, have invented the herein-described Improvements in Strip-Solder.

The purpose of the invention is to facilitate the transport, mode of dispensing and use of strip solder, or solder wire, generally heretofore sold and used in continuous lengths as unwound from spools or hanks.

The invention consists in the manner and means of assemblage of solder strips in unit package form, whereby certain economies and conveniences are attained, as will hereinafter more fully appear.

The accompanying drawing shows several alternate forms of the invention, Figure 1 being a perspective view of the simplest and preferred form; and Figs. 2 and 3 being modifications.

The solder wire or strip may be of round, flat or angular section and of any composition, with or without a flux incorporated with it. Several sections of such wire, each of substantially the same length and assembled in substantially parallel arrangement, are joined together at one end of the assemblage by means which permits individal sections to be bent back singly or in groups as required for use, while the remaining wires still retain their bunch formation. The turned back wire is thus rendered available for application to the joint to be soldered, while the rest of the bunch forms a convenient handle, particularly efficient in that it possesses large superficial area from which the heat may be dissipated by radiation. As successive strips are thus consumed others can be turned back in like manner, until the whole bunch is used. The butt or button remaining can also be used the same as the wire if preferred, since the last remaining wire can still form a handle wherewith to hold it against the joint, or the said butt can be saved as scrap, or indeed even thrown away, and if the latter, will represent no greater waste than ordinarily occurs when using cut lengths of continuous wire taken from the ordinary spools or hank, or when using bar solder.

The means of joining the assemblage of strips may be a bond of the solder itself produced by slightly fusing the ends of the wires and smearing them together as intended to be illustrated by Fig. 1, or by casting a button of solder upon and over the assembled ends, as shown in Fig. 3. It may also be accomplished by consolidating the homologous ends by pressure, or by securing a hard metal cap thereto, or the strips may be made, in the first instance integrally with each other or as integral portions of a part itself forming the solder bond, each strip being held thereby to the others in a unit package, for the purposes set forth. The security of the attachment of whatever type, need of course be no greater than will hold the wires against accidental separation; and manifestly that form of attachment is preferable which leaves the smallest residuum. In the form of Fig. 1, the wires can readily be torn from the bunch if desired.

While the packages shown herein are of round or general circular section, they may obviously also be square or angular in section and moreover, they are desirably composed of solder wires in sufficient number and length to conform to standard units of weight, as, for instance, half-pounds, or pounds, whereby the dealer may dispense them the more readily and avoid the unrolling and weighing now generally necessary, this being an important feature of my invention as will be evident.

In Fig. 1, the oblique line represents a joint or thing to be soldered. 1 designates the solder wire in use, 2 the remainder of the bunch serving as handle, and 3 the smeared-together ends of the wires forming the bond in this form.

In Fig. 2, 4 designates the crimped cap forming the bonding means in this form, and in Fig. 3, 5 represents the bond formed by casting a solder button upon the ends of the wires, the dome-shape of the cast button in this case forming an excellent location for a trademark or other information.

The improvement constituting this invention as above described, is claimed as follows:

1. As a new article of manufacture, a bunch of solder strips, each joined to the others at one end of the bunch and forming a package from which individual strips can be used, as required.

2. A solder strip bunch comprising an assemblage of parallel strips bonded at their ends to form a unit package from which individual strips may be turned back as required for use while the remaining assembled strips serve as a handle therefor.

3. A solder strip bunch composed of parallel and substantially equal sections of solder, compactly held together in unit package form whereby individual sections may be successively turned back as required for use, and the remaining section used as a handle for such turned-back section.

In testimony whereof, I have signed this specification in the presence of two witnesses.

CHARLES P. TOLMAN.

Witnesses:
PIERSON DE HART,
R. I. TOWNLEY.

Copies of this patent may be obtained for five cents each, by addressing the "Commissioner of Patents, Washington, D. C."